United States Patent

Visitacion

[15] 3,665,842
[45] May 30, 1972

[54] TOASTING APPARATUS

[72] Inventor: Aniceto R. Visitacion, 705 West 179th Street, New York, N.Y. 10035

[22] Filed: Sept. 17, 1970

[21] Appl. No.: 72,986

[52] U.S. Cl................................99/332, 99/353, 99/355, 99/387, 99/389
[51] Int. Cl. .........................................A47j 37/08
[58] Field of Search..................99/332, 400, 342, 353, 355, 99/352, 386, 387, 389; 118/2

[56] References Cited

UNITED STATES PATENTS

| | | | |
|---|---|---|---|
| 1,621,234 | 3/1927 | Carpenter | 99/352 |
| 1,666,335 | 4/1928 | Lentz | 99/353 |
| 2,014,595 | 9/1935 | Simmons | 99/355 |
| 2,027,002 | 1/1936 | Spang | 99/355 X |
| 2,703,521 | 3/1955 | Marriott | 99/355 |
| 2,804,818 | 9/1957 | March | 99/352 X |
| 2,828,714 | 4/1958 | Sandberg | 118/2 |
| 3,033,099 | 5/1962 | Marriott | 99/352 X |
| 3,156,178 | 11/1964 | Kormos | 99/355 |

*Primary Examiner*—Billy J. Wilhite
*Attorney*—Sparrow & Sparrow

[57] ABSTRACT

An apparatus for toasting slices of bread constituting a hopper, feeder means for feeding the bread slices to a heated toasting section, operating means for moving the toasted slices from the toasting section to a buttering device and then to cutter means, and delivery means for depositing the toasted cut slices onto a tray or the like.

12 Claims, 11 Drawing Figures

Patented May 30, 1972

INVENTOR.
ANICETO R. VISITACION

BY

SPARROW AND SPARROW
ATTORNEYS

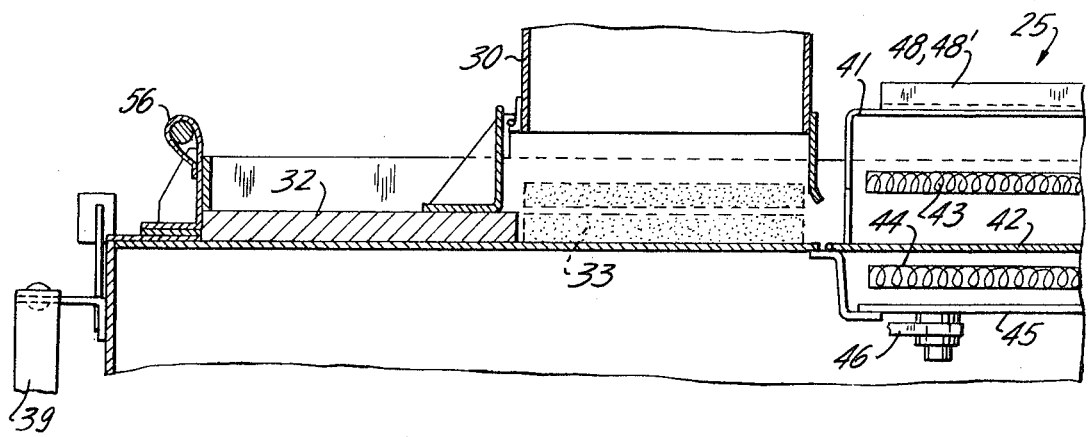
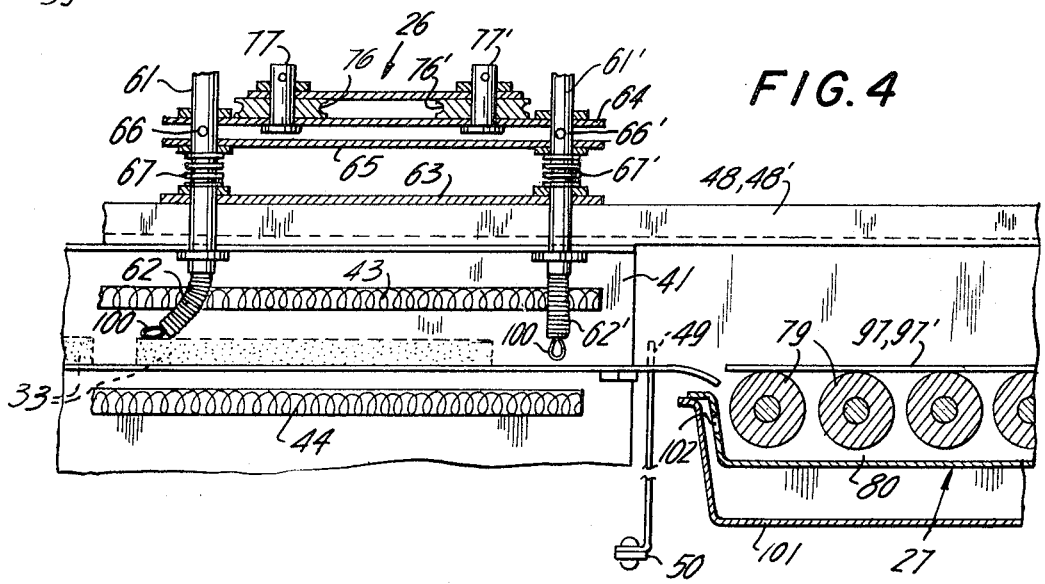
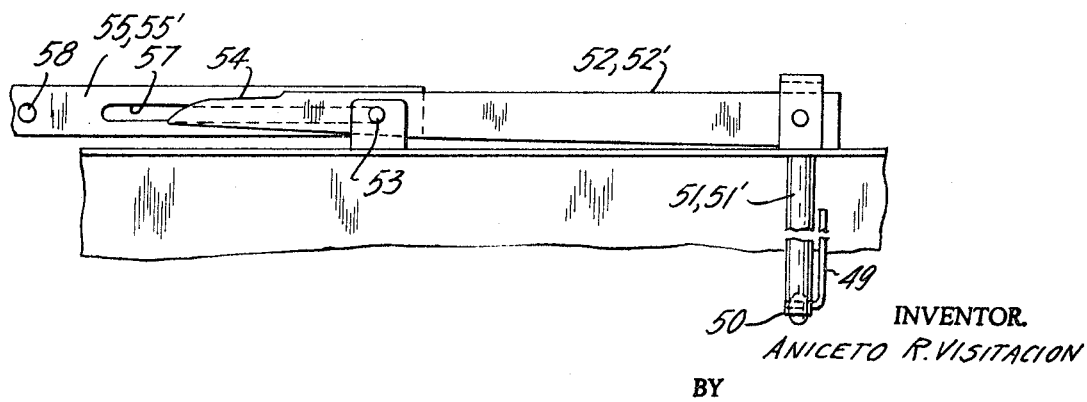
INVENTOR.
ANICETO R. VISITACION
BY
SPARROW AND SPARROW
ATTORNEYS

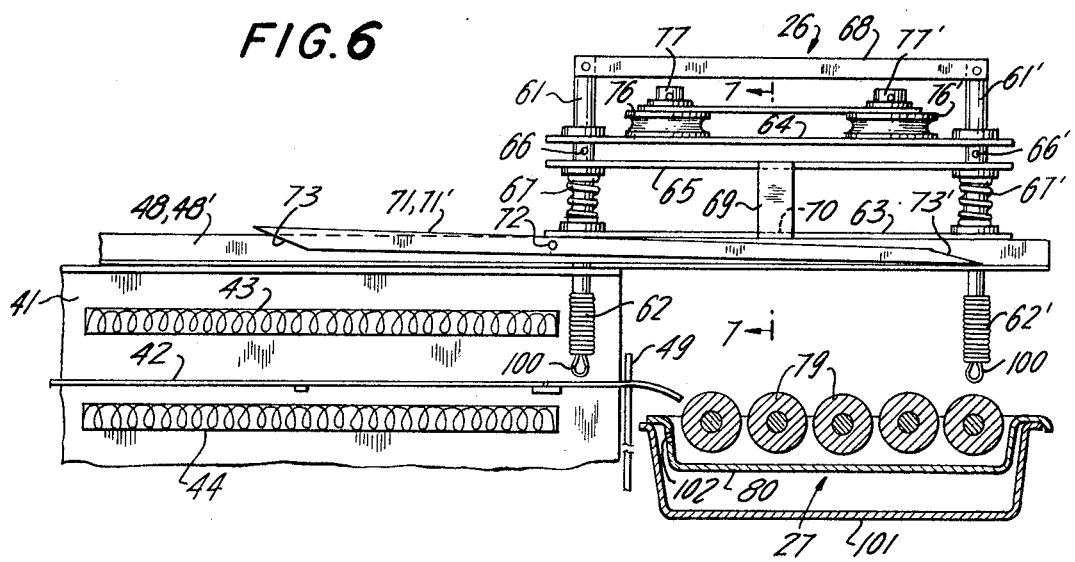
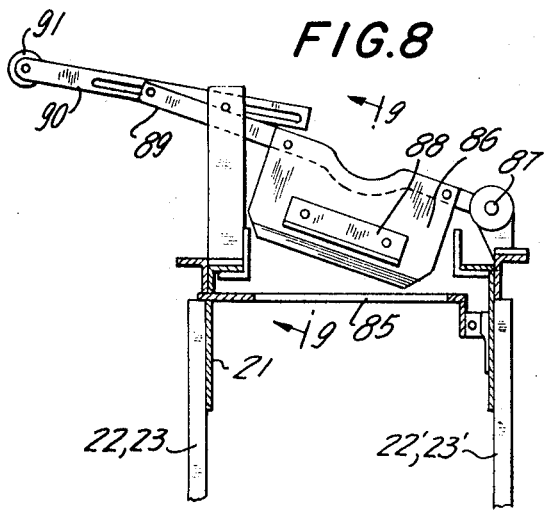
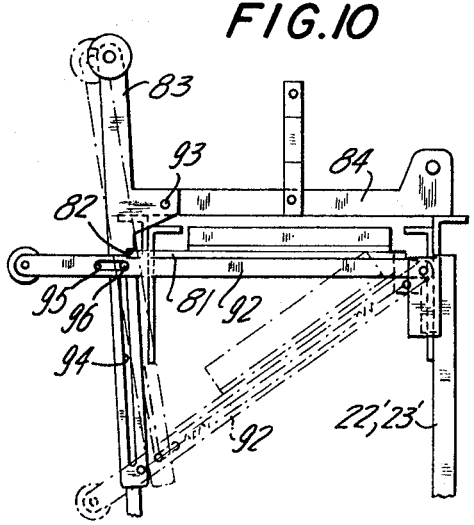
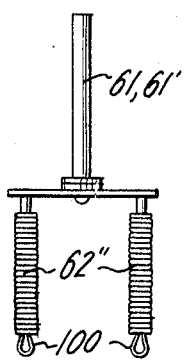
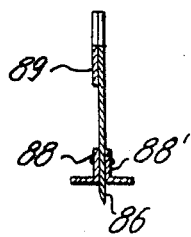
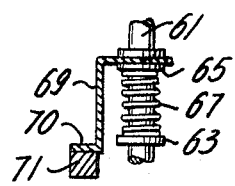
INVENTOR.
ANICETO R. VISITACION
BY
SPARROW AND SPARROW
ATTORNEYS

TOASTING APPARATUS

BACKGROUND OF THE INVENTION

This invention relates to apparatus for toasting slices of bread and particularly to a semi-automatic sliced bread feeding, toasting, buttering, cutting and delivering machine.

Mechanically operated, fully automatic toasting machines are known, but these machines are constructed with more or less complicated motor drives and are essentially designed for heavy duty and mechanized mass production. Obviously, these machines are expensive and they are not practical or useful for intermittent or single piece production. There are other devices of this kind known which could be used for small needs but these devices are not very handy and do not do the whole job of delivering a completely buttered, cut-sliced piece of toast ready for being served.

It is a desideratum of this invention to solve the problem of providing a simple, semi-automatic apparatus for producing toasted slices of bread, buttered or unbuttered, and delivering the same ready for being served.

SUMMARY

The invention consists in such novel features, construction arrangements, combinations of parts and improvements as may be shown and described in connection with the apparatus herein disclosed by way of example only and as illustrative of a preferred embodiment.

The apparatus or machine according to the invention fills the need for a toaster for small and medium size public eating places with varying demands for quantities of ready-made pieces of toast. The apparatus can be operated without particular skill by an attendant of such eating places. The apparatus is equipped with mechanisms which enable the operator to produce the toasted pieces, ready for being served, without being touched or otherwise handled by the operator or attendant. In other words, the operation of the apparatus is highly hygienical. A wrapped stack of slices of bread is slipped from an open end of its conventional wrapping into the hopper of the apparatus. Butter is placed in a small pan in the buttering section of the apparatus. The heating device for toasting the slices may be turned on for continuous duty or for single operation. A first lever is operated for moving a first slice of bread out of the hopper into the toaster and a timing device having signalling means is switched on automatically. A second operation of the lever will move a second slice into the toaster behind the first slice. When the timing device gives a signal after the preset time has expired, a second lever is moved by the operator whereby spaced apart flexible spring means slide over the freshly toasted slices. The flexible springs will move the slice (or both slices, as the case may be) by the return stroke of the second lever out of the toaster and over a bank of rollers dipping into melted butter which is in a pan underneath the rollers. In this way the toasted slice which is still hot, receives on one side an adequate coating with butter. The movement continues by the same return stroke of the second lever until the toasted and buttered slice is stopped by an abutment of a delivery plate. The delivery plate has a slot which is arranged at a distance from the abutment corresponding to half the length of the slice. A cutter is arranged in register with the slot so that the operation of the cutter will cut the buttered toast into two halves. The ensuing operation of a fourth lever will release the delivery plate which can swing downward similar to a trap door, whereupon the two halves of the buttered toast will slide down onto a serving dish placed below. The entire operation is performed without the toast being touched or handled by merely operating four levers. It is obvious that the operation may be continuously repeated until the requested quantity of toast pieces has been produced.

Objects and advantages of the invention will be set forth in part hereafter and in part will be obvious herefrom or may be learned by practicing the invention, the same being realized and attained by means of the instrumentalities and combinations pointed out in the appended claims.

It is an object of the invention to provide a new and improved apparatus or machine for toasting bread slices, in which there is incorporated also toast buttering, slicing and delivering devices.

Another object of the present invention is to provide a semi-automatic apparatus for producing toasted bread slices which are ready for being served.

A further object of the present invention is to provide a toast producing apparatus of simple construction which can be operated easily and efficiently for both individual and continuous production.

Various further and more specific purposes, features and advantages will clearly appear from the detailed description given below taken in connection with the accompanying drawings which form part of this specification and illustrate merely be way of example one embodiment of the device of the invention.

BRIEF DESCRIPTION OF THE DRAWINGS

In the following description and in the claims, parts will be identified by specific names for convenience, but such names are intended to be as generic in their application to similar parts as the art will permit. Like reference characters denote like parts in the figures of the drawings, in which

FIG. 3 is a partial longitudinal section of the apparatus, taken along the line 3—3 in FIG. 1; partly broken away;

FIG. 4 is a further partial longitudinal section of the apparatus, taken along the line 4—4 in FIG. 1, partly broken away;

FIG. 5 is a side view of the cam operating the stop at the end of the toaster, partly broken away;

FIG. 6 is a side view of the toast forwarding device and a section of the toast buttering device, with the side wall of the toaster removed;

FIG. 7 is a detail part of the forwarding device, taken along the line 7—7 in FIG. 6;

FIG. 8 is a cross section of the toasting device taken along the line 8—8 of FIG. 1;

FIG. 9 is a section of the toast cutter shown in FIG. 8, taken along the line 9—9 of FIG. 8.

FIG. 10 is an end view of the toasting device, illustrating the toast delivery device.

FIG. 11 is a view of one of the toast propelling parts of the forwarding device in FIGS. 6 and 7.

DESCRIPTION OF THE PREFERRED EMBODIMENT

Figure 1:
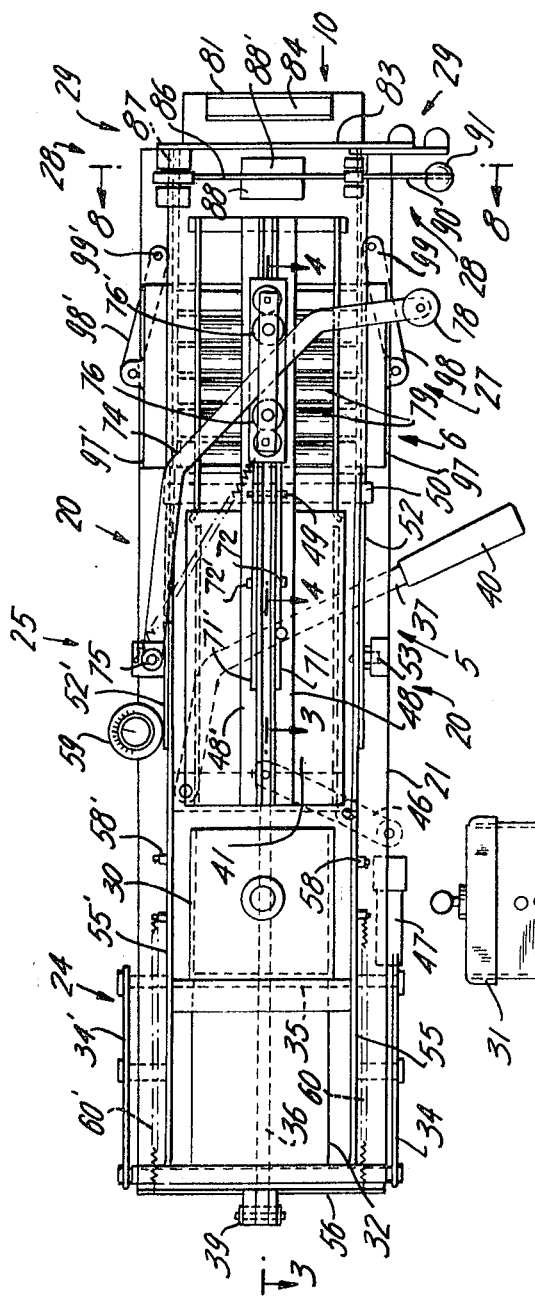
FIG. 1 is a plan view of the toasting apparatus.
Figure 2:
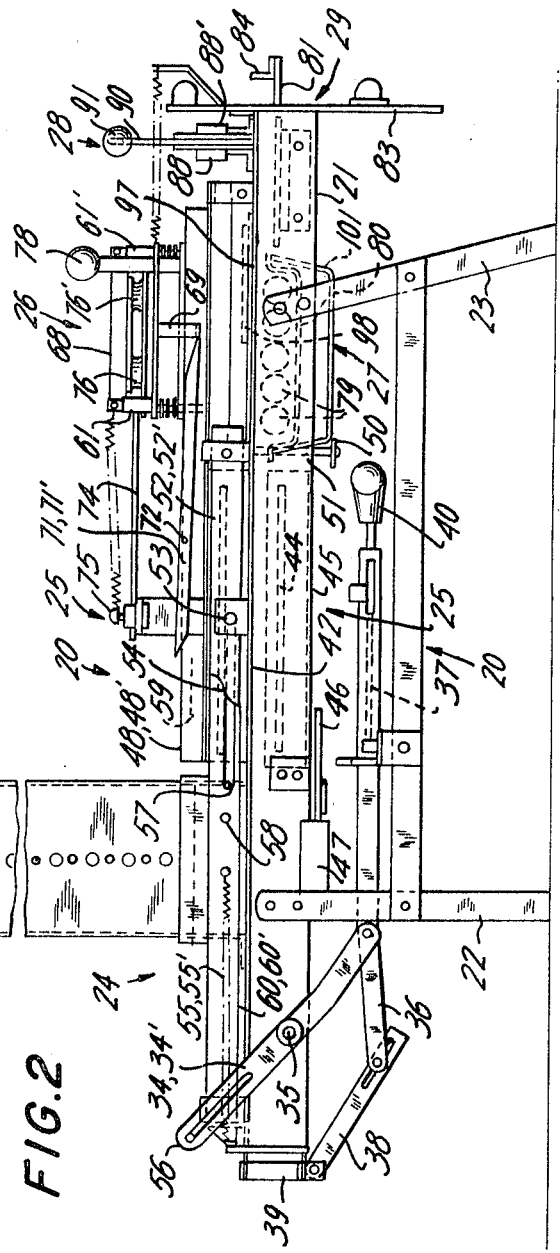
FIG. 2 is a side elevation of the apparatus shown in FIG. 1.

Referring now in more detail to the drawing illustrating a preferred embodiment by which the invention may be realized, there is shown in FIG. 1 the plan view and in FIG. 2 the side elevation of the toasting apparatus 20 of this invention. The apparatus has a substantially rectangular body 21 supported by legs 22, 23. On body 21 are arranged a hopper feeder 24, a toaster 25, a toast forwarding device 26, a toast buttering section 27, a toast slicer 28 and a toast delivery 29.

Hopper feeder 24 consists of a vertically arranged hopper 30 with a square section conforming to the size of a conventional slice of bread. Hopper 30 is high enough to hold a full loaf of bread and is closed by a lid 31. A pusher 32 is slidably arranged on body 21 for moving the lower-most slice of bread 33 forward (FIG. 3). Pusher 32 is operated by a linkage composed of two pivotally swingable double-arm levers 34,34', which are connected by a cross rod 35. A push bar 36 which is reciprocally moved by a pivotally mounted hand lever 37, is connected at an intermediate point to cross rod 35 and is extended beyond this point to a guide link 38 which is swingably suspended on a bracket 39 on the rear side of body 21. Lever 37 has a conveniently arranged handle 40 extending outside body 21. Toaster 25 which is arranged adjacent to hopper 30, comprises a tunnel-like housing 41, the bottom of which consists of a grid 42 made of wires. Upper heating coils 43 and lower heating coils 44 are longitudinally arranged in housing 41 in conventional manner. A bread crumb pan 45 is placed underneath grid 42. Pan 45 is movable by means of a lever 46 with a foldable handle 47. Housing 41 has an open slot in the top thereof, with two angle bars 48, 48' on the right and on the left side, respectively, of the slot. Angle bars 48, 48' extend over the entire length of housing 41 and over the length of buttering section 27 which is arranged following toaster 25. At the forward end of housing 41 is a stop mechanism with a vertically movable stop 49 for holding bread slice (or slices) 33 in toaster 25 during the toasting time period. Stop 49 is mounted on a cross bar 50 which is attached to two vertical shafts 51, 51' on the front and the rear side, respectively, of body 21. Two double-arm levers 52, 52' are pivotally mounted on studs 53 on the front and the rear side of body 21, the ends of one arm of levers 52, 52' being linked to the upper ends of vertical shafts 51, 51', respectively. The ends of the other arm of levers 52, 52' have a cam shape 54 (FIG. 5). Two sliding bars 55, 55' are movably attached to the cross bar 56 of pusher 32. Bars 55, 55' slide on top of body 21 on the front and the rear side, respectively, thereof. They have a longitudinal slot 57 which is guided on stud 53. A pin 58 is mounted on bars 55, 55' in such place as to engage cam shape 54 for depressing the arm of levers 52, 52', moving thereby stop 49 upwardly. This action takes place when slice 33 of bread is moved by pusher 32 into toaster 25. Bar 55' on the rear side of body 21 operates a timer also which is adjustable and which gives a signal, either audible or visible, when the toasting time is expired, so that the operator of the apparatus may perform the next following operation. Pusher 32 and the mechanism which operates it also sets timer 59 in motion at the forward stroke. Pusher 32 is retracted into the starting position by springs 60, 60' after a slice 33 of bread had been moved from hopper 30 into toaster 25 by operating lever 37.

After the toasting time has been expired, toast forwarding device 26 is operated, by which operation slice 33 of bread is buttered by moving it over buttering section 27 and onto toast delivery 29 where toast slicer 28 is also located. Forwarding device 26 consists substantially of two vertically disposed bars 61, 61' which have closely wound helical coil springs 62, 62' acting as propelling lugs attached at the lower ends thereof (FIG. 4). Coil springs 62, 62' have looped lower ends 100 for protecting the freshly toasted slices of bread from being damaged. Bars 61, 61' are guided in the slot of housing 41 and between angle bars 48, 48' and are furthermore vertically movable in a lower slide plate 63 and in an upper plate 64. A third plate 65 is arranged between lower plate 63 and upper plate 64. Third plate 65 is held in place by pins 66, 66' on bars 61, 61', and helical coil springs 67, 67' are placed on bars 61, 61' between slide plate 63 and third plate 65. Bars 61, 61' are connected by a cross bar 68 on the upper ends thereof. A hook-shaped bracket 69 is attached in the center of third plate 65 in such manner that the hook end 70 extends downwardly (FIGS. 6,7). A pair of cam bars 71, 71' are tiltably arranged on pivots 72, 71' on the outside of angle bars 48, 48' in such manner that hook end 70 may slide over the former in one direction and engage underneath it by moving in the opposite direction. Cam bars 71, 71' have two cam ends 73, 73' and the pivot points 72, 72' are located in such manner that the part of cam bars 72, 71' having cam end 73' is heavier than the other part. Thus cam bars 72, 71' always have the tendency to tilt when hook end 70 does not engage it. The mechanism works as follows: When lower slide plate 63 is moved over tunnel-like housing 41 and thus over the toasted slice (or slices) 33 of bread, hook end 70 rides on top of tiltable cam bars 71, 71' (direction to the left in FIGS. 1, 2, 4, 6), third plate 65 is lifted whereby springs 67, 67' aid in the lifting. The ends of helical coil springs 62, 62' can slightly slide in the lifted position over the toasted slice (or slices) 33 of bread without moving the latter back out of toaster 25. At the end of this stroke, hook end 70 drops off tiltable cam bars 71, 71' whereby the lighter cam end 73 tilts upwardly. When the return stroke of slide plate 63 starts, hook end 70 slips below cam bars 71, 71' due to cam end 73, whereby third plate 65 is moved down and helical coil springs 62, 62' can move toasted slice (or slices) 33 out of toaster 25 since stop 49 had been lowered by the return stroke of lever 37. Slide plate 63 and forwarding device 26 is moved reciprocatingly by a lever 74 which is pivotally mounted on a stud 75 (FIG. 1). Lever 74 extends freely between rollers 76, 76' which are rotably arranged on vertical studs 77, 77' on plate 64, and has a convenient hand-knob 78 at the end thereof. As shown in FIG. 11, helical coil spring 62, 62' may be replaced with double springs 62''.

During the return stroke of slide plate 63, toasted slice (or slices) 33 is moved over a bank of rollers 79, which are freely rotatable between the side walls of body 21. Rollers 79 dip into a pan 80 underneath them, in which butter is placed. The heat of the freshly toasted slices keeps the butter in at least a very soft, if not melted state. In order to avoid sorting due to an accidental overflow of the butter, a second pan 101 may be placed underneath pan 80 which has a few overflow holes 102 on the side thereof. When buttering is not required or is not desired, sliding plates 97, 97' are provided which can be pushed through slots in angle bars 48, 48' (slots not visible in the drawing) over buttering rollers 79 so that the toasted slices of bread may be pushed across rollers 79 without touching them. Plates 97, 97' are swingably suspended on links 98, 98' which in turn are pivotally mounted on studs 99, 99'. The forwarding motion of the toasted and buttered slice of bread is continued by the same return stroke until the slice is moved onto a delivery plate 81, which is hingedly suspended on the inside of the rear wall of body 21 and which is releasably held in the horizontal position by a notch 82 in the release lever 83 (FIG. 10). A stop bracket 84 is arranged on delivery plate 81 for placing the finished slice of bread in the correct position for the slicing. A slot 85 is provided in plate 81 in the center thereof and a cutting knife 86 is pivotally mounted on a shaft 87 in register with slot 85. Hold-down angle bars 88, 88' are fastened on the sides of knife 86, respectively, for holding slice 33 in place during cutting them into two parts. The lever arm 89 on which knife 86 is fastened, has a slidable extension 90 with a hand-hold 91 for convenience. Delivery plate 81 is also supported by a hinged lever 92. Release lever 83 is pivotally mounted on a stud 93. A slot 94 in release lever permits hinged lever 92 to drop so that delivery plate 81 can also drop in trap-door fashion when release lever 83 is clockwise operated for unlatching 81 out of notch 82. Lever 92 also has a small slot 95 and a bolt 96 connects lever 92 with release lever 83 through slots 94 and 95. Thus, the finished toasted, buttered and cut slices 33 of bread may slide down onto a serving dish placed below (not shown in the drawing), without being touched by the hand of the operator or attendant.

While the invention has been described and illustrated with respect to a certain preferred example which gives satisfactory results, it will be understood by those skilled in the art after understanding the principle of the invention, that various other changes and modification may be made without departing from the spirit of the invention.

I claim:

1. Toasting apparatus for toasting slices of bread, comprising a hopper feeder for receiving and storing slices of bread to be toasted, a toaster spaced from said hopper feeder for toasting said slices after passage from said hopper feeder, means for transporting said slices from said hopper feeder to said toaster, toast buttering means spaced from said toaster for applying butter to said slices after toasting, reciprocatingly movable toast forwarding means for forwarding said slices from said feeder to said toaster and to said buttering means in sequence, lug means disposed on said forwarding means, cam means in the path of motion of said lug means for lifting and lowering said lug means at the respective ends of said reciprocating movement and thereby carrying out the sequence of processing said slices through said feeder, toaster and buttering means, and toast delivery means communicating with said toast forwarding means for receiving buttered and toasted slices of bread from said forwarding means and delivering said buttered and toasted slices for consumption.

2. Toasting apparatus according to claim 1, said hopper feeder having a vertically disposed hopper for vertically stacking said slices of bread, linkage operated pusher means disposed for moving the lowermost one of said slices of bread one at a time, a vertically movable stop at the end of said toaster, link means disposed for operating said stop, said link means having cam means, and means on said pusher linkage for operating said link means, said means on said pusher linkage being disposed for engaging said cam means.

3. Toasting apparatus according to claim 2, and an adjustable timer coupled to said pusher means, said timer being set in motion by said linkage of said pusher means.

4. Toasting apparatus according to claim 2, said toast buttering means comprising a plurality of freely rotatable rollers and butter holding means below said rollers, said rollers being disposed for dipping into said butter holding means.

5. Toasting apparatus according to claim 4, said flexible lug means comprising spaced apart pairs of helically coiled springs.

6. Toasting apparatus according to claim 2, said lug means comprising at least two paced apart helically coiled springs.

7. Toasting apparatus according to claim 2, and toast cutting means in predetermined position relative to said delivery means, said cutting means and delivering means comprising a hinged delivery plate having an elongated slot therethrough, said cutting means being swingably suspended and disposed in register with said slot, an end stop on said plate for positioning said toasted and buttered slice of bread, and a release lever having latching means for holding said plate in substantially horizontal position, said release lever disposed for unlatching said delivery plate and permitting the latter to drop in trap-door fashion for slidingly delivering said toasted, buttered and cut slice of bread on receiving means when placed below said delivery means.

8. Toasting apparatus according to claim 1, said toast buttering means comprising a plurality of freely rotatable rollers and butter holding means below said rollers, said rollers being disposed for dipping into said butter holding means.

9. Toasting apparatus according to claim 1, said lug means comprising at least two spaced apart helically coiled springs.

10. Toasting apparatus according to claim 9, said coils having rounded ends.

11. Toasting apparatus according to claim 9, said cam means for lifting and lowering said lugs comprising tiltable means having a front cam end and a rear cam end and hook-shaped bracket means on said forwarding means, said bracket means having a substantially hook end, said hook end disposed for sliding at the forward stroke of said forwarding means over said tiltable means and for sliding at the return stroke of said forwarding means under said tiltable means.

12. Toasting apparatus according to claim 1, and toast cutting means in predetermined position relative to said delivery means, said cutting means and delivering means comprising a hinged delivery plate having an elongated slot therethrough, said cutting means being swingably suspended and disposed in register with said slot, an end stop on said plate for positioning said toasted and buttered slice of bread, and a release lever having latching means for holding said plate in substantially horizontal position, said release lever disposed for unlatching said delivery plate and permitting the latter to drop in trap-door fashion for slidingly delivering said toasted, buttered and cut slice of bread on receiving means when placed below said delivery means.

* * * * *